(12) United States Patent
Grosch

(10) Patent No.: US 11,507,478 B2
(45) Date of Patent: Nov. 22, 2022

(54) METHOD FOR OPERATING A REDUNDANT AUTOMATION SYSTEM

(71) Applicant: Siemens Aktiengesellschaft, Munich (DE)

(72) Inventor: Thomas Grosch, Roβtal (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/480,222

(22) Filed: Sep. 21, 2021

(65) Prior Publication Data

US 2022/0091946 A1    Mar. 24, 2022

(30) Foreign Application Priority Data

Sep. 22, 2020 (EP) ...................... 20197341

(51) Int. Cl.
*G06F 11/16* (2006.01)

(52) U.S. Cl.
CPC ................. *G06F 11/1683* (2013.01)

(58) Field of Classification Search
CPC ................................. G06F 11/1683
See application file for complete search history.

(56) References Cited

U.S. PATENT DOCUMENTS

| 9,052,887 | B2* | 6/2015 | Rohleder ............ G06F 9/38 |
| 9,389,971 | B2* | 7/2016 | Grosch .............. G06F 11/2023 |
| 2015/0095690 | A1 | 4/2015 | Grosch et al. |
| 2015/0134082 | A1 | 5/2015 | Grosch et al. |

FOREIGN PATENT DOCUMENTS

| EP | 2857913 | 4/2015 |
| EP | 2860598 | 4/2015 |

\* cited by examiner

*Primary Examiner* — Joseph R Kudirka
(74) *Attorney, Agent, or Firm* — Cozen O'Connor

(57) ABSTRACT

Method for operating a redundant automation system to control a technical process, wherein a second fail-safe subsystem is operated redundantly in relation to a first fail-safe subsystem, and wherein the faulty second fail-safe subsystem is used, where synchronization data is initially buffered in the second subsystem, and in the event that no errors are identified, the first fail-safe subsystem sends an error-free message to the second fail-safe subsystem to acknowledge the error-free message with an error free acknowledgment and process the initially buffered synchronization data.

5 Claims, 5 Drawing Sheets

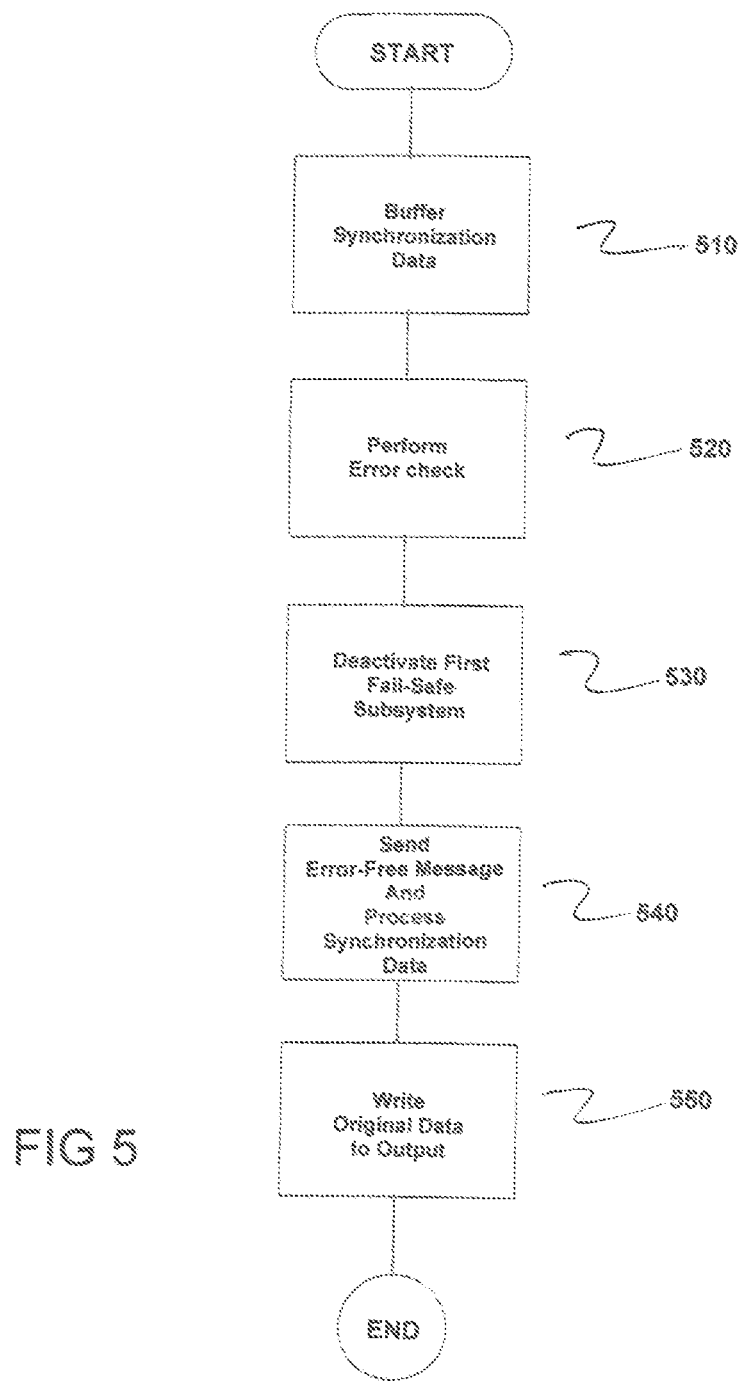

METHOD FOR OPERATING A REDUNDANT AUTOMATION SYSTEM

BACKGROUND OF THE INVENTION

1. Field of the Invention

The invention relates to a method for operating a redundant automation system for controlling a technical process, wherein a first fail-safe subsystem is operated with a first control program divided into first program sections, control of the technical process is performed by the first fail-safe subsystem and a second fail-safe subsystem is operated redundantly with a second control program divided into second program sections, where the first fail-safe subsystem generates and evaluates events with its first control program, which influences an execution sequence of the first program sections in the first control program according to the events which have occurred and, on the basis of the or events that have been generated or occurred per program section, makes available synchronization data provided with an index, which reflects the respective program section, for the second fail-safe subsystem and makes available original data for output means, where the original data is initially held back and not yet recorded at the output, and where the first subsystem with the processing of the respective first program sections relating to the index of the processing of the respective second process sections of the second subsystem precedes the second subsystem.

2. Description of the Related Art

In the field of automation, highly available solutions (H-systems), which are suited to reducing possibly occurring idling times of an installation to a minimum, are increasingly required. An H-system employed in the field of automation is characterized by having two or more subsystems that are coupled to one another via a synchronization link in the form of automation devices or computer systems. In principle, both subsystems can have read and/or write access to the peripheral units connected to this H-system. One of the two subsystems leads with respect to the peripheral device connected to the system. This means that outputs to peripheral units or original information for these peripheral units are only implemented by one of the two subsystems, i.e., by the subsystem that operates as a master or has taken over the master function.

Aside from the reliability of the automation system, an automation system of this type in automation engineering must frequently realize additional safety-critical functions. One such automation system is referred to below as HF system. The two subsystems (HF-CPU1 and HF-CPU2) that operate redundantly in relation to one another are now additionally able to process a safety-oriented control program. In addition, these two subsystems communicate with a likewise safety-oriented on-output module (F-IO) via a safety-oriented protocol.

In the context of applicant's invention, the synchronization data is used so that an event that has occurred on a first subsystem is synchronized with a second subsystem, so that in the event that the first subsystem fails, the course of a technical process to be controlled can then be immediately assumed by the second subsystem. Without knowledge of the event, which has occurred on the first subsystem, the execution sequence of the program sections on the second subsystem cannot be complied with. The second subsystem can only run through the required program sequences as well if it knows the events on the first subsystem and the course of a technical process to be controlled is not disturbed.

Furthermore, in the context of applicant's invention, safety-oriented HF-CPUs or the respective fail-safe subsystems can diagnose errors during the processing of their control programs and thereupon to transfer the installation or the respective subsystem into a safe state.

With a realization of a redundantly operating automation system based on two fail-safe subsystems (two HF-CPUs), the object underlying the invention is for the following problem to occur. The first fail-safe subsystem operates as a preceding HF-CPU and identifies an error in its local processing, e.g., caused by a hardware defect. This will automatically deactivate itself with this error identification. However, further errors may occur on account of transmission of the synchronization data from the first fail-safe subsystem to the second fail-safe subsystem that has already occurred. Put differently, in other words, the preceding HF-CPU will supply the subsequent HF-CPU with faulty synchronization data. The subsequent HF-CPU or the second fail-safe subsystem will now shortly thereafter likewise discover an error in its processing and deactivate itself. The problem now is that both subsystems (both HF-CPUs), which are now deactivated, result in loss of the system control. The error response to the subsequent HF-CPU is, however, only produced as a result of the synchronization of faulty data. The subsequent HF-CPU could, however, continue to control the process without any problems.

SUMMARY OF THE INVENTION

In view of the foregoing, it is accordingly and object of the invention to provide a method for operating a redundant automation system with a first fail-safe subsystem and a second fail-safe subsystem to ensure that if the first fail-safe subsystem fails, the second fail-safe subsystem is not supplied with faulty synchronization data.

This and other objects and advantages are achieved in accordance with the invention by a method in which the second subsystem the synchronization data is initially buffered, where the first fail-safe subsystem initially sends the available original data provided with the index of the respective first program section to the second fail-safe subsystem and the second fail-safe subsystem acknowledges this by acknowledging an output to the first fail-safe subsystem, within the first fail-safe subsystem an error check is performed at the end of the respective program section, with which the error-free cycle of the first control program is checked in the respective program section. In the event an error is identified, the first fail-safe subsystem is deactivated and the control of the technical process is performed by the second fail-safe subsystem. In the event no errors are identified, the first fail-safe subsystem sends an error-free message to the second fail-safe subsystem to acknowledge the error-free message with an error-free acknowledgement, and the initially buffered synchronization data is processed with the second program section matched to the index. When the first fail-safe subsystem receives the error free acknowledgement, the first original data relating to the output is written.

The first fail-safe subsystem can also be considered to be a preceding system and the second fail-safe subsystem can accordingly be considered to be a subsequent system. If an output of original data is now performed by the preceding system, this output is therefore initially to be acknowledged by the subsequent system. This ensures that the outputs are not impacted when the preceding system fails. The subsequent system stores the synchronization data locally in an UFO memory, for instance, but does not initially process synchronization data. The preceding system then only outputs original data to a peripheral device once an error check has occurred, which confirms the fail-safe processing of the respective program section. An error check typically occurs at the end of each program section (e.g., section n) on the preceding system.

If no errors are identified during this check, then the preceding system thus signals this to the subsequent system with a special message ("F-check o.k."). This message triggers the subsequent system to process the previously stored synchronization data and, on its part, to likewise implement an F-check at the end of the section n.

After the error-free acknowledgement by the subsequent system, the preceding system outputs the original data to the peripheral device. The next section preferably then only begins when the subsequent system has likewise completed the section n and has acknowledged this to the preceding system with a cycle acknowledgement.

Accordingly, it is advantageous for the second subsystem to send a cycle acknowledgement to the first subsystem, which confirms that the second program section associated with the index has been successfully processed without errors.

In the event that an error is identified on the first fail-safe subsystem, the second fail-safe subsystem rejects all synchronization data, which was stored after the last error free acknowledgement and assumes control of the process during standalone operation.

If the first subsystem shows an error in the next section n+1, for instance, the first subsystem deactivates immediately. The second subsystem now rejects all synchronization data, which is to be found in the FIFO memory after the last "F-check o.k." message. The second subsystem therefore switches to standalone operation. The previously subsequent HF-CPU, i.e., the second subsystem, will therefore now become the leading subsystem and now executes the section n+1, which results in a correspondingly longer response time of the system when the preceding system fails. The somewhat longer response time could be reduced by the following solution. Accordingly, it is advantageous if the synchronization data in the second subsystem is processed independently of the error-free message immediately with the second program section matched to the index, and in the event that the error-free message arrives at the second fail-safe subsystem, the program state is additionally backed up in a core image. In the event that the error-free message is absent and the first subsystem has failed, the last backup of the program state is downloaded from the core image and the program continues to be processed with this program state and control of the technical process is performed by the second fail-safe subsystem.

This optimization of the response time is achieved because the subsequent system immediately processes the received synchronization data without waiting for the message "F-check o.k.". In order to nevertheless avoid errors from being carried over from the preceding system to the subsequent system, the subsequent system stores the current state, i.e., a core image, of the almost synchronously running program at the end of a program section as soon as the subsequent system receives or has received the message "F-check o.k.". Local storage of the program state via a core image can be realized with good or optimal performance, at the same time, the subsequent system deletes the core image of the preceding section. As soon as the subsequent system has reached the end of a program section, the subsequent system acknowledges this to the preceding system. This can start the next program step immediately. This accelerates the cycle of the system and therefore also reduces the response times.

If the subsequent system identifies the failure of the preceding system, the subsequent system charges the last backed up core image and begins with the independent processing of the process values/events during standalone operation. The already received and already processing synchronization data from section n+2 is accordingly rejected because it can contain potentially distorted instructions.

It is also considered advantageous for a transmission of the synchronization data from the preceding system to the subsequent system to be able to occurs temporally asynchronously. As a result, a processing power of the preceding system is, on the one hand, decoupled from the communication bandwidth available for an event synchronization, which is conflicting particularly with respect to the increasing imbalance between the rise in the processing power of the processors, on the one hand, and rise in the communication processors, on the other.

On account of the temporally asynchronous communication between the preceding system and the subsequent system, it is possible to also use slow communication links to set up a highly available automation system. This means that a poor communication link or also a communication link can also be provided with respect to the transmission bandwidth or response time, where the communication link is also used by other communication subscribers and thus is not available exclusively to both subscribers for this synchronization purpose.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

On the basis of the drawings, in which an exemplary embodiment of the invention is illustrated, the invention, its embodiment and the advantages are explained in more detail below, in which:

FIG. 5 is a flowchart of the method in accordance with the invention.

DETAILED DESCRIPTION OF THE EXEMPLARY EMBODIMENTS

Figure 1:
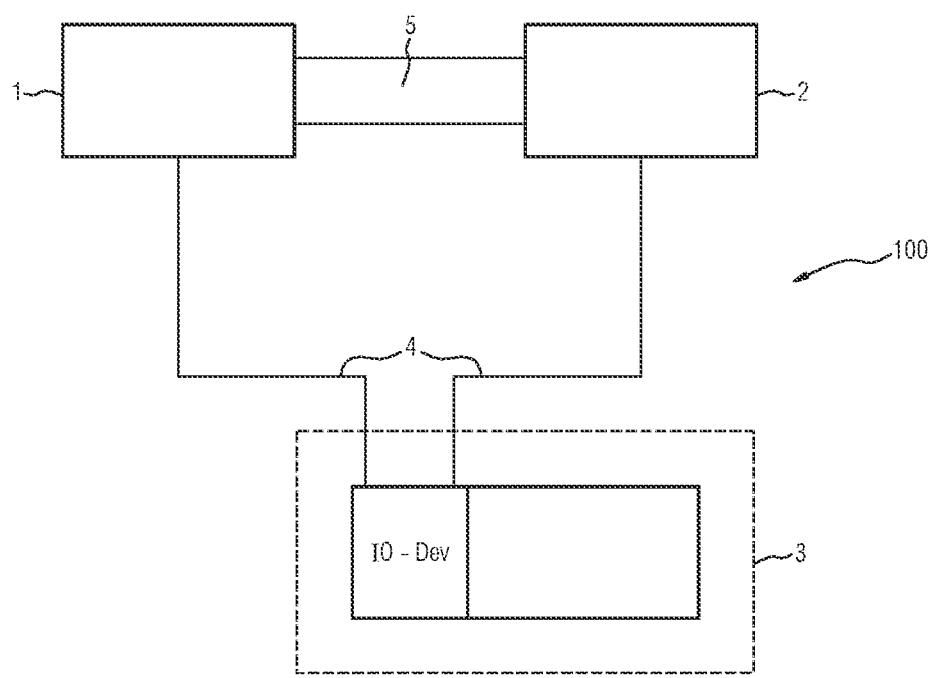
FIG. 1 is an illustration of a redundant automation system in accordance with the prior art.

With reference to FIG. 1, a conventional redundant automation system 100 for controlling a technical process is shown. In accordance with the prior art, a first fail-safe subsystem 1 is coupled to a second fail-safe subsystem 2 via a communication channel 5 for synchronization data. The first fail-safe subsystem 1 and the second fail-safe subsystem 2 are each coupled to a peripheral device 3 via a field bus 4. An output IO-Dev is available in the peripheral device 3.

One disadvantage of the conventional redundant automation system 100 shown is FIG. 1 is that, with a synchronization of the second fail-safe subsystem 2 via the first fail-safe subsystem 1, faulty synchronization data can be transmitted. The second fail-safe subsystem could likewise be disturbed with this faulty synchronization data.

Figure 2:
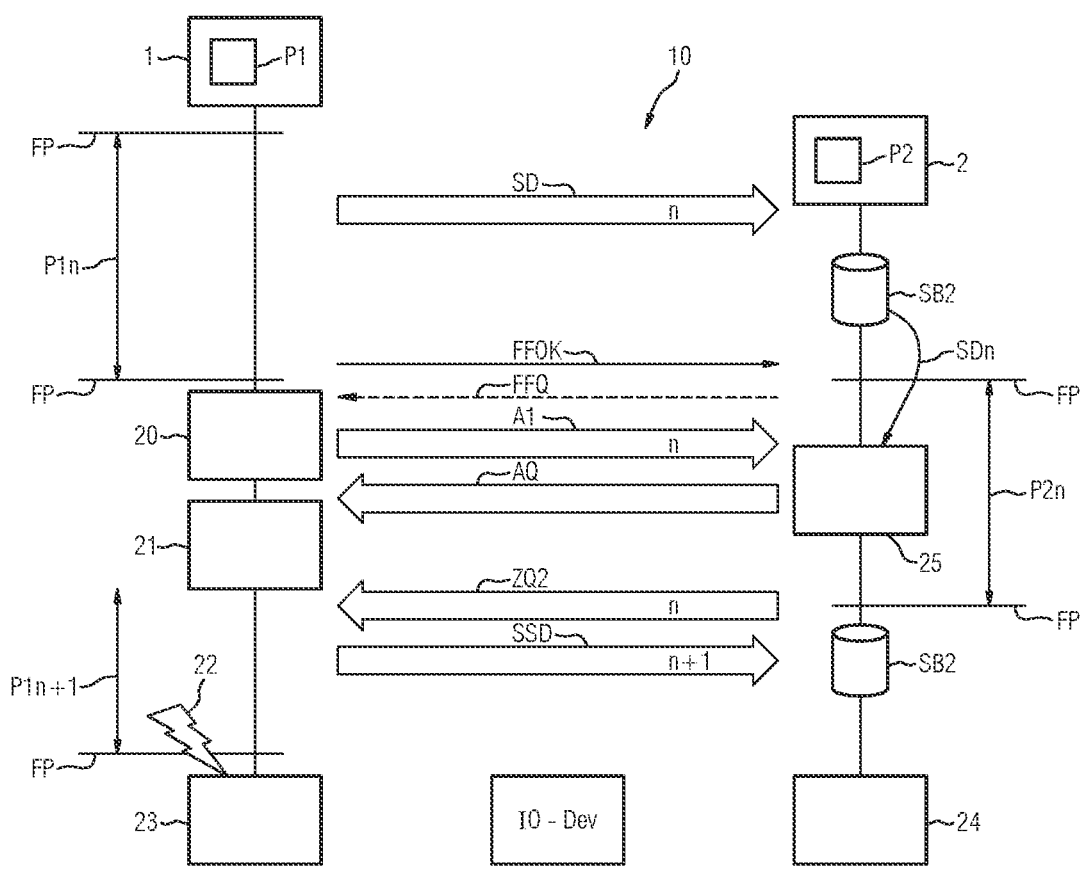
FIG. 2 is an illustration of a cycle in accordance with the method for a redundant automation system in a first alternative embodiment.

A first approach, in accordance with the method of the invention, for solving the problem is shown via FIG. 2 in order to bypass the problem that the second fail-safe subsystem 2 operates with faulty synchronization data.

As in the conventional system shown in FIG. 1, the first fail-safe subsystem 1 is connected communicatively with the second fail-safe subsystem 2 and synchronization data SD is exchanged. In the first fail-safe subsystem 1, a first control program P1 divided into first program sections P1$n$ is available and is operated accordingly. In the second fail-safe subsystem 2, a second control program P2, which is divided into second program sections P2$n$, is operated redundantly in relation to the first control program P1.

The first fail-safe subsystem 1 with its first control program P1 generates and evaluates events. These events, which are program and process-specific, influence an execution sequence of the first program sections P1$n$ in the first control program P1. To ensure that the second fail-safe subsystem 2 becomes aware of these influential events, the first fail-safe subsystem 1 makes synchronization data SD provided with an index n, per program section P1$n$ available, where the index reflects the respective program section P1$n$, for the second fail-safe subsystem 2.

Original data A1 for the output IO-Dev are also made available in the first fail-safe subsystem 1 by the first control program P1, where the original data A1 is initially held back and is not yet written to the output IO-Dev. The first subsystem 1 generally precedes the second subsystem 2 with the processing of the respective first program sections P1$n$ with respect to the index n of the processing of the respective second program sections P2$n$ of the second subsystem 2.

In order to now prevent the second subsystem 2 from operating with faulty synchronization data SD, the synchronization data SD is initially buffered in the second subsystem 2 in a second storage area SB2.

An error check FP is performed in the first fail-safe subsystem 1 at the end of a respective program section P1$n$. As a result, an error-free cycle of the first control program P1 can be signaled in the respective program section P1$n$. If no errors are identified, the first fail-safe subsystem 1 will then send an error-free message FFOK to the second fail-safe subsystem 2, whereupon this acknowledges the error-free message FFOK with an error-free acknowledgement FFQ and the initially buffered synchronization data SD is read out from the second storage area SB2 for data processing and processed with the second program section P2$n$ matched to the index n. Upon receipt of the error-free acknowledgment FFQ, the first fail-safe subsystem 1 writes the original data A1 to the output IO-Dev. Accordingly, an error check FP is cyclically introduced in the vertical temporal course relating to the first fail-safe subsystem 1. The program sections P1$n$, P1$n$+1 are each performed. It is essential here that the original data A1 was already transmitted in the step 20 and made available to the second fail-safe subsystem 2, but has not yet been written by the step 21 to the process or to the output IO-Dev.

According to the description of the method for FIG. 2, no error has occurred in the first program step P1$n$, but in the next program section P1$n$+1, an error case 22 occurs at the end of the error check FP. In the event that an error was identified, the first fail-safe subsystem 1 is deactivated. The first fail-safe subsystem 1 moves into a stop 23 state and the control of the technical process is performed by the second fail-safe subsystem 2. The second fail-safe subsystem 2 accordingly moves into standalone operation 24 and accordingly does not download the supposedly faulty synchronization data from the second storage area SB2.

Figure 3:
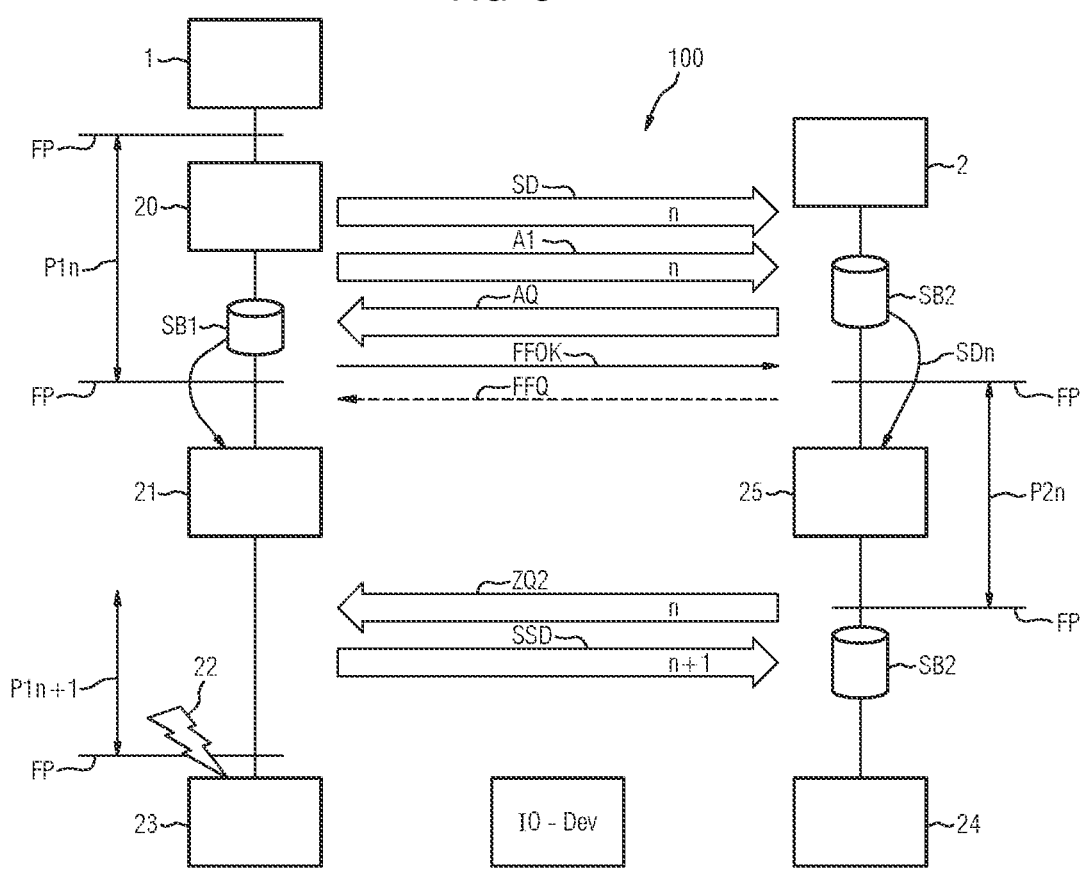
FIG. 3 is an illustration of a cycle in accordance with the method for a redundant automation system according to a second alternative embodiment.

With reference to FIG. 3, in this alternative embodiment of the method in accordance with the invention, the original data A1 and an output acknowledgement AQ are already exchanged with one another before the error check FP, but the original data A1 is only written to the process via step 21 when the error-free message FFOK is sent and the error-free acknowledgement FFQ is accordingly received.

Figure 4:
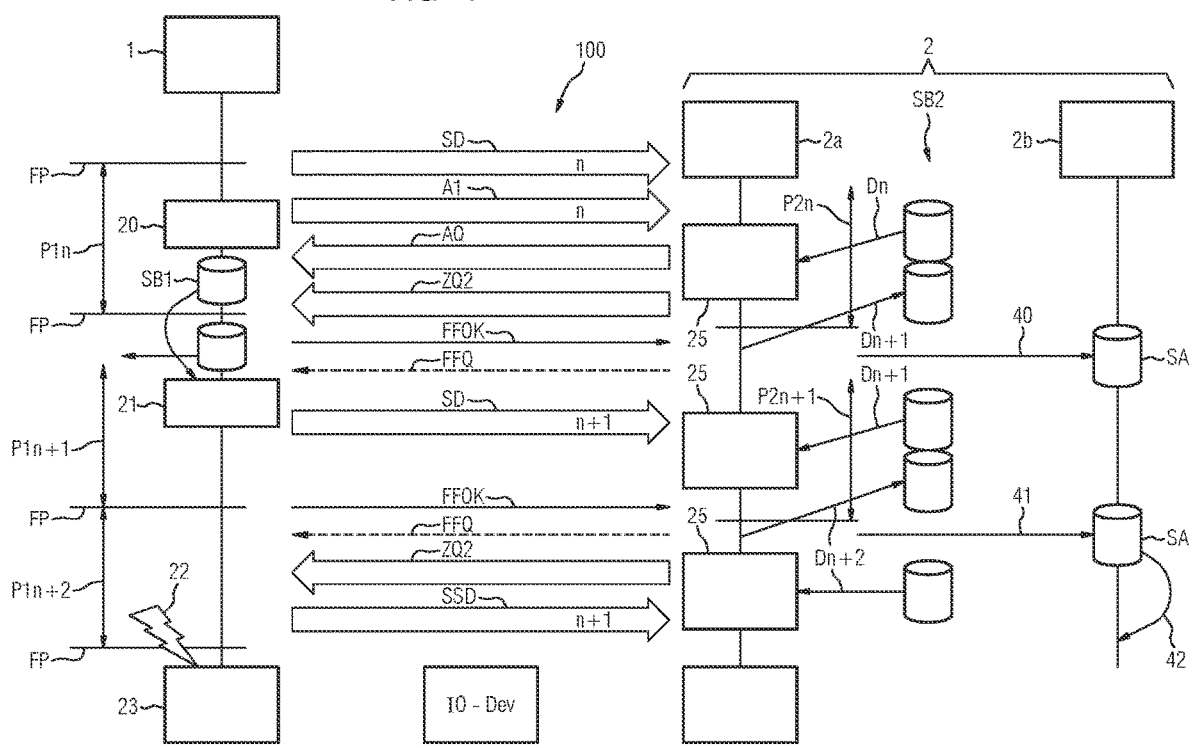
FIG. 4 is an illustration of a cycle for a redundant automation system in accordance with a third alternative embodiment.

With respect to the response times of the overall system, the method depicted in FIG. 4 is considered to be an efficient method.

Provision is made here for the synchronization data SD in the second subsystem 2 to be processed independently of the error-free message FFOK immediately with the second program section P2$n$ that matches the index n. For improved representation, the second fail-safe subsystem 2 is divided into a processor area 2$a$ and a storage area 2$b$. It is clear with the step data processing 25 that, in the processor area 2$a$, the incoming synchronization data SD is processed immediately for the second program section P2$n$. The second fail-safe subsystem 2 is already supplied with the original data A1 in parallel thereto. The second fail-safe subsystem 2 accordingly sends the output acknowledgement AQ and also a cycle acknowledgement ZQ2. An F-check FP occurs in the first fail-safe subsystem 1, which confirms that the first program section P1$n$ has no errors. As there are no errors, the buffered original data A1 is now written to the process and the error-free message FFOK is transmitted to the second fail-safe subsystem 2. As a result, a backup of the program state PM in a core image SA is triggered in the second fail-safe subsystem 2. A core image n is stored with step 40. In the event that the error-free message FFOK is absent and the first subsystem 1 has failed, the last backup of the program state Pn−1 is downloaded from the core image SA and the program processing is continued with this program state and control of the technical process is performed by the second fail-safe subsystem 2.

FIG. 5 is a flowchart of the method for operating a redundant automation system 100 for controlling a technical process, where a first fail-safe subsystem 1 is operated with a first control program P1 divided into first program sections P1$n$, where the control of the technical process is performed by the first fail-safe subsystem 1 and a second fail-safe subsystem 2 is operated redundantly with a second control program P2 divided into second program sections P2$n$. In addition, the first fail-safe subsystem 1, with its first control program P1 generates and evaluates events that influence an execution sequence of the first program sections P1$n$ in the first control program P1 according to the events that have occurred and based on the generated or events that have occurred per program section P1$n$, makes available synchronization data SD provided with an index n, which reflects a respective program section P1$n$, for the second fail-safe subsystem 2 and makes available original data A1 for an output IO-Dev. Further, the original data A1 is initially held back and is not yet written to the output IO-Dev, and the first subsystem 1 precedes the second subsystem 2 with the processing of the respective first program sections P1$n$ in relation to the index n of the processing of the respective second program sections P1$n$ of the second subsystem 2. As such, the method comprises buffering the synchronization data SD initially in the second subsystem 2, as indicated in step 510. In accordance with the invention, the first fail-safe subsystem 1 initially sends the available original data A1 provided with the index n of the respective first program section P1$n$ to the second fail-safe subsystem 2 and the second fail-safe subsystem 2 acknowledges this occurrence by acknowledging an output AQ to the first fail-safe subsystem 1.

Next, an error check FP is performed in the first fail safe subsystem 1 at an end of the respective first program section P1$n$, as indicated in step 520. Here, an error free cycle of the first control program P1 is checked via the error check in the respective first program section P1$n$.

Next, the first fail-safe subsystem 1 is deactivated and controlling the technical process is controlled by the second fail-safe subsystem 2 in an event that an error is identified, as indicated in step 530.

Next, the first fail-safe subsystem 1 sends an error-free message FFOK to the second fail-safe subsystem 2 in an event that no errors are identified to acknowledge the error free message FFOK with an error-free acknowledgment FFQ and process the initially buffered synchronization data SD with the second program section P2 matching the index n, as indicated in step 540.

Next, the first original data A1 is written to the output IO Devi upon receipt of the error-free acknowledgement FFQ by the first fail-safe subsystem 1, as indicated in step 550.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a redundant automation system for controlling a technical process, a first fail-safe subsystem being operated with a first control program divided into first program sections, the control of the technical process being performed by the first fail-safe subsystem, and a second fail-safe subsystem being operated redundantly with a second control program divided into second program sections, the first fail-safe subsystem, with its first control program generates and evaluates events which influence an execution sequence of the first program sections in the first control program according to the events which have occurred and based on the generated events which have occurred per program section, makes available synchronization data provided with an index, which reflects a respective program section, for the second fail-safe subsystem and makes available original data for an output, the original data being initially held back and not yet being written to the output, and the first fail-safe subsystem preceding the fail-safe second subsystem with processing of the respective first program sections in relation to the index of the processing of the respective second program sections of the second subsystem, the method comprising:
    buffering the synchronization data initially in the second subsystem, the first fail-safe subsystem initially sending the available original data provided with the index of the respective program section to the second fail-safe subsystem and the second fail-safe subsystem acknowledging receipt of the available original data provided with the index of the respective program section by acknowledging an output to the first fail-safe subsystem;
    performing an error check in the first fail-safe subsystem at an end of the respective program section, an error free cycle of the first control program being checked via the error check in the respective program section;
    deactivating the first fail-safe subsystem and controlling the technical process by the second fail-safe subsystem in an event that an error is identified;
    sending, by the first fail-safe subsystem, an error-free message to the second fail-safe subsystem in an event that no errors are identified to acknowledge the error-free message with an error-free acknowledgment and process the initially buffered synchronization data with the second program section matching the index; and
    writing first original data to the output upon receipt of the error-free acknowledgement by the first fail-safe subsystem.

2. The method as claimed in claim 1, wherein the second fail-safe subsystem sends a cycle acknowledgement to the first fail-safe subsystem, said cycle acknowledgement confirming that a second program section associated with the index has been processed successfully and without errors.

3. The method as claimed in claim 2, wherein in an event an error is identified on the first fail-safe subsystem, the second fail-safe subsystem rejects all synchronization data, which was stored after a last error free acknowledgement and assumes control of the technical process in standalone operation.

4. The method as claimed in claim 1, wherein in an event an error is identified on the first fail-safe subsystem, the second fail-safe subsystem rejects all synchronization data, which was stored after a last error free acknowledgement and assumes control of the technical process in standalone operation.

5. The method as claimed in claim 1, wherein the synchronization data in the second subsystem is processed independently of the error-free message immediately with the second program section which matches the index;
    wherein in an event that the error-free message arrives at the second fail-safe subsystem, the program state is additionally backed up in a core image; and
    wherein in an event that the error-free message is absent and the first subsystem has failed, a last backup of the program state is downloaded from the core image and program processing is continued with the last backup of the program state and control of the technical process is performed by the second fail-safe subsystem.

* * * * *